W. H. ROGERS.
Fish Way.

No. 228,936. Patented June 15, 1880.

WITNESSES:
A. Schehl.
C. Sedgwick.

INVENTOR:
W. H. Rogers
BY Munn & Co
ATTORNEYS.

United States Patent Office.

WILLIAM H. ROGERS, OF AMHERST, NOVA SCOTIA, CANADA.

FISHWAY.

SPECIFICATION forming part of Letters Patent No. 228,936, dated June 15, 1880.

Application filed February 18, 1880.

*To all whom it may concern:*

Be it known that I, WILLIAM HENRY ROGERS, of Amherst, in the county of Cumberland, Province of Nova Scotia, and Dominion of Canada, have invented a new and useful Improvement in Fishways, of which the following is a specification.

Figure 1:
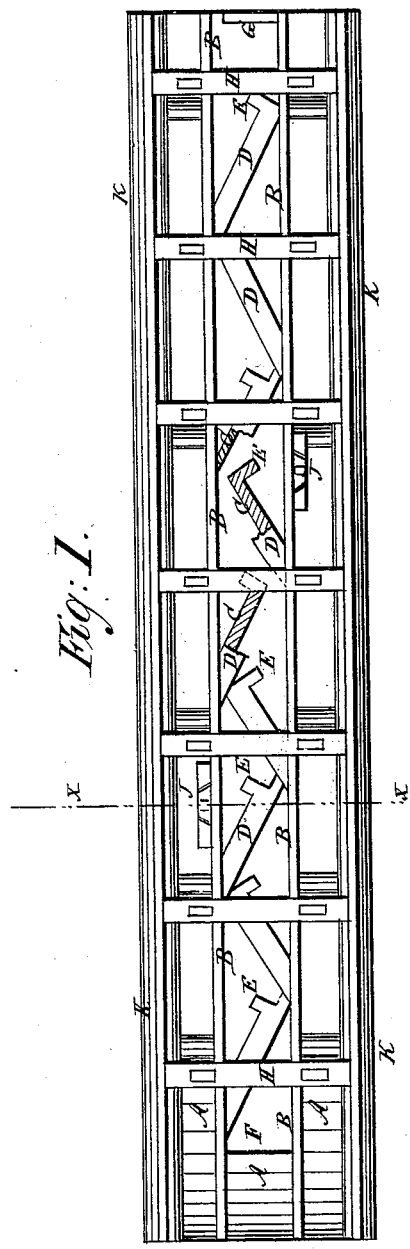
Figure 2:
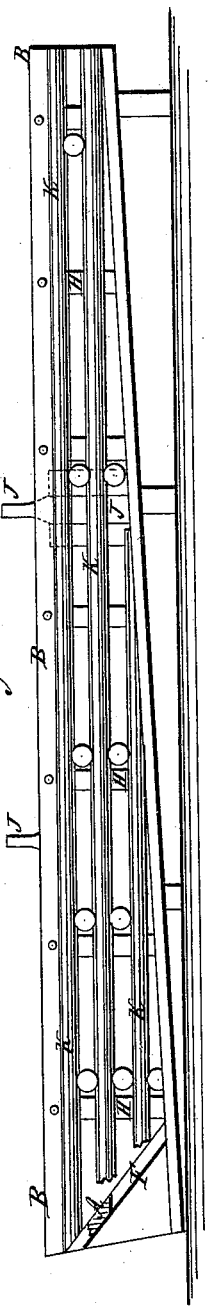
Figure 3:
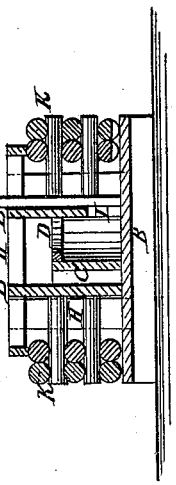

Figure 1 is a plan view of the improvement. Fig. 2 is a side elevation. Fig. 3 is a sectional end elevation taken through the line $x$ $x$, Fig. 1.

Similar letters of reference indicate corresponding parts.

The object of this invention is to construct fishways in such a manner that the fish will readily find the entrance, and which can be used at all stages of water.

The invention consists in constructing the fishway with inclined partitions having openings and flanges at their upper ends and with openings and slides at their sides; also, in constructing the fishway with its lower end connected with an opening in the lower part of the dam, and extending it up stream with a gradual rise.

A represents a dam, against the upper side of which the lower end of the fishway B rests. The fishway B is made with an inclined flat bottom and vertical sides, forming a channel or trough, and having a rise of about one foot in eight or ten.

The sides of the fishway should rise above the surface of the water for their whole length. The lower part of the channel is divided into a zigzag passage-way by inclined partitions C, the lower ends of which are attached alternately to the sides of the fishway B, an opening being left between the upper end of each partition C and the side of the lower end of the next upper partition for the passage of the fish.

The lower edges of the partitions C are attached to the bottom of the fishway B, and their upper edges are attached to bars D, the ends of which are attached to the sides of the said fishway.

To the upper side of the upper end of each partition C is attached a flange, E, to lengthen the opening at the said upper end of the partition and to check the water. With this construction there will be formed between the upper side of each partition C and the opposite side of the fishway B pools of dead water, where the fish can swim about and rest before continuing their course up the fishway.

The lower entrance, F, to the fishway is formed through the lower part of the dam A. The upper end of the fishway B is partly closed by a cross-partition, fender, or guard, G, the opening being at the opposite side from the opening at the upper end of the first partition C. The fishway is held together by a frame-work, H. With this construction the fish, in ascending the stream, swim up to the dam, and swimming along its base they find a sluggish stream flowing out through the opening F, which they enter and pass up through the fishway.

Openings I are formed in the sides of the fishway B at different distances from the lower end, which are designed for use when the water gets low, and which are closed with slides J when not required for use.

The fishway is protected from ice, logs, and other floating substances by wharfing or piering K, erected at its sides, as shown in Figs. 1, 2, and 3. The upper end of the fishway may also be protected by a short cross-pier, which is not shown in the drawings.

Having thus described my invention, I claim as new and desire to secure by Letters Patent—

The fishway constructed substantially as herein shown and described, consisting of the channel or trough B, the partitions C, forming openings and having flanges E at their upper ends, the side openings, I, and slides J, and the wharfing or piering K, as set forth.

WM. HENRY ROGERS.

Witnesses:
WILLIAM GREENFIELD,
SAML. R. GREENFIELD.